United States Patent [19]

Takata et al.

[11] Patent Number: 4,492,336
[45] Date of Patent: Jan. 8, 1985

[54] COOKER WITH HEATING CONTROL SYSTEM

[75] Inventors: Manabu Takata, Yamatokoriyama; Shojiro Inoue, Nara; Keiichi Mori, Izumiotsu, all of Japan

[73] Assignee: Matsushita Electric Industrial Co., Ltd., Kadoma, Japan

[21] Appl. No.: 473,437

[22] Filed: Mar. 9, 1983

[30] Foreign Application Priority Data

Mar. 17, 1982 [JP] Japan .................................. 57-43469
Apr. 13, 1982 [JP] Japan .................................. 57-61585
Apr. 14, 1982 [JP] Japan .................................. 57-62745

[51] Int. Cl.$^3$ ........................... F23N 1/08; F24C 3/00
[52] U.S. Cl. ............................... 236/20 A; 126/39 G; 219/450; 374/107
[58] Field of Search ................... 236/20 A; 126/39 G; 99/328, 329 R; 219/450; 374/107

[56] References Cited

U.S. PATENT DOCUMENTS 3,820,399 6/1974 De Gouville ..................... 236/20 A
4,230,731 10/1980 Tyler ............................... 374/107 X
4,320,285 3/1982 Koether ........................... 99/329 R

FOREIGN PATENT DOCUMENTS 54-98876 8/1979 Japan .............................. 126/39 G Primary Examiner—William E. Wayner
Attorney, Agent, or Firm—Wenderoth, Lind & Ponack

[57] ABSTRACT

A high performance automatic temperature control system enables fries and Japanese tempura to be prepared in optimum condition.

The temperature of the outer bottom surface of a container being heated is measured by a temperature sensor a given time later. A temperature rise gradient of the temperature sensor established at a given time in the initial stage of heating is used as a temperature correction value peculiar to the container, while a temperature rise gradient of the temperature sensor established after a certain temperature has been reached is used as a temperature correction value for the amount of food being cooked. The former and latter temperature correction values are converted into preset temperature values and serve as operating temperatures for the temperature sensor.

When the temperature sensor reaches the operating temperature, the heating rate is controlled to hold the operating temperature. Thus, the system performs automatic temperature control irrespective of the kind of the material, wall thickness and size of the container, by means of the temperature rise gradients of the temperature sensor so as to ensure that the preset temperature and the temperature of the food are equal.

23 Claims, 12 Drawing Figures

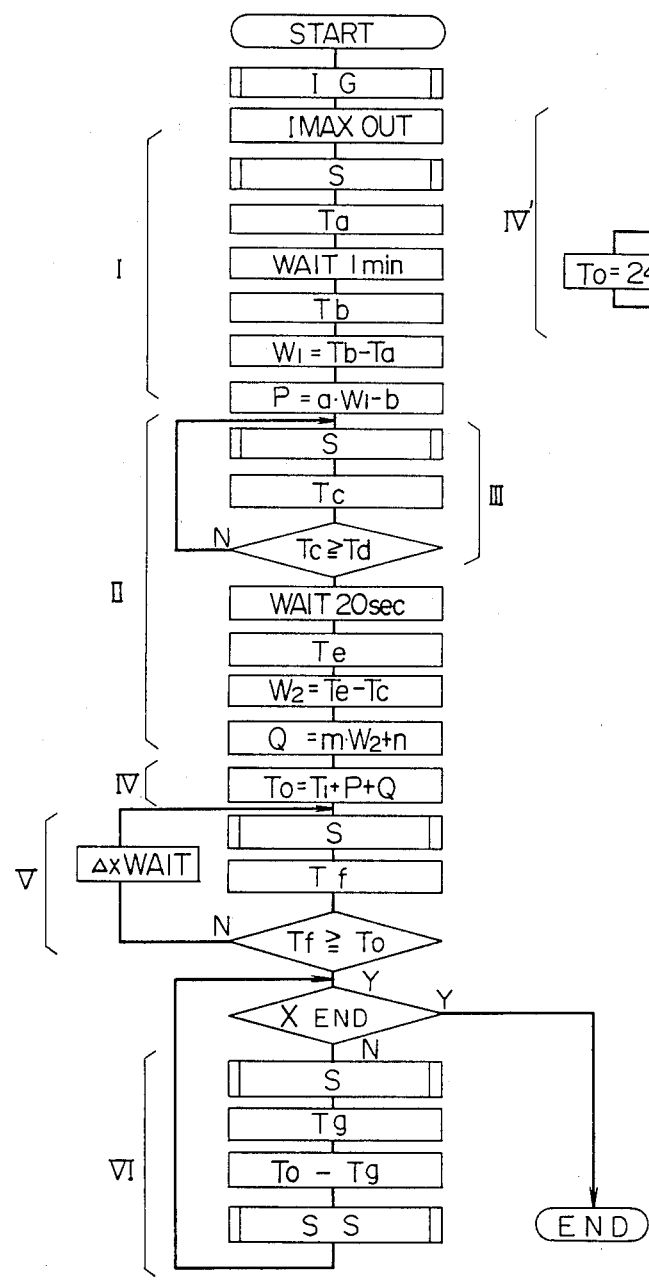
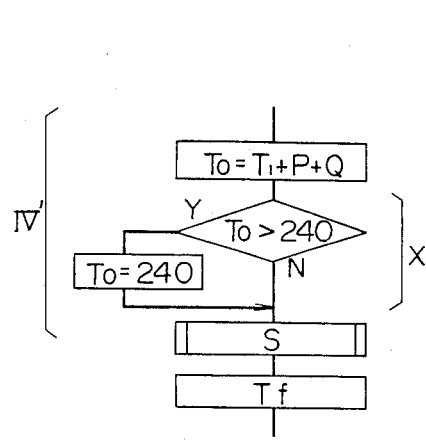
FIG. 4
FIG. 7

COOKER WITH HEATING CONTROL SYSTEM

BACKGROUND OF THE INVENTION

1. Field of the Invention

The present invention relates to a cooker with heating control system wherein its heater, such as a gas heater or electric heater, is automatically controlled with a high accuracy, thereby preventing heating over of pan.

2. Description of the Prior Art

Cooking demands optimum temperatures, and it is difficult to make a temperature adjustment to such an optimul temperature. For example, in the case of preparing fries or Japanese tempura, too high or too low an oil temperature would result in a tasteless dish.

Hitherto, such a device as shown in FIG. 10(a) has been proposed that temperature of the food material 5 of a cooking pan 4 is measured by a sensor 6' and control circuit 14' issues a signal to control a valve 2 such as a proportional valve or a two step valve, thereby to control heat amount of the heater 3 basing on the temperature, which is measured by the sensor 6'. However, in the conventional device of FIG. 10(a), the temperature sensor 6' is to be put in the cooking pan, and is not easy to use, and gives a feeling of insanitary or hazardous. Therefore, another device as shown in FIG. 10(b) has been proposed to detect temperature at the bottom of a pan 4 by contacting a sensor 6 to the bottom of a pan 4; but this device has a problem that the detected temperature is different from the actual temperature of the contents and the trouble is that the difference varies depending on material, shape or size of the pan 4 and the amount of the food material 5.

SUMMARY OF THE INVENTION

A cooking temperature control system according to the present invention is designed to detect the temperature of the bottom of a pan while correcting the preset temperature according to the kind of the pan and the amount of the contents of the pan, so as to obtain a temperature suitable for the cooking and while, on the basis of the optimum temperature thus attained, increasing or decreasing the heating rate or stopping the heating, thereby maintaining the temperature of the food at a constant value.

Another object of the invention is to obtain, with high accuracy, a correction temperature according to the kind of the pan without limiting the working conditions, wherein in order to determine a temperature correction value with respect to a preset temperature by detection of the kind of the pan, means are provided to calculate the correction temperature as a function of the gradient of temperature rise of a temperature sensor during rise of temperature of the bottom of the pan at a given time after ignition; to calculate the correction temperature by making correction according to the heating start temperature; and to cope with a situation in which the gradient of temperature rise of the bottom of the pan is excessively high or low, in such a manner as to treat it as a special pan, not a common one, and adopt a preset correction temperature.

A further object is to obtain, with high accuracy, a correction temperature according to the amount of cooking, wherein in order to determine a temperature correction value with respect to preset temperature by detection of the amount of cooking, means are provided to calculate the correction temperature as a function of the gradient of temperature rise of a temperature sensor for a given time after the temperature rise of the bottom of the pan has stabilized according to the amount of cooking, and adopt a preset correction temperature if the correction temperature according to the amount of cooking exceeds the preset upper or lower limit.

Another object is to provide an arrangement for detecting the temperature at a temperature detecting section at given intervals of time by a temperature sensor, including a comparison section for comparing the correction temperature at a temperature correction section, thus facilitating control by a microcomputer and to realize reliable temperature control in a simple manner by program processing alone.

A further object is to prevent overheating by providing an upper temperature limit which is the sum of a temperature correction value determined by detection of the kind of the pan and by detection of the amount of cooking, and a set temperature.

Finally, an object is to provide an arrangement wherein a temperature sensor is in contact with the outer bottom surfce of the pan to detect its temperature, thus eliminating the inconvenience of putting the temperature sensor into the pan, and thereby improving the usage.

To achieve the aforesaid objects, a cooking temperature control system according to the present invention is designed to detect the kind of the pan by means of the initial temperature rise of a temperature sensor, determine the temperature correction value according to the kind of the pan, judging the amount of food being cooked from the stabilize temperature rise of the temperature sensor, and make temperature correction of the food in connection with the temperature sensor.

In the above arrangement, if a pan is designated, detection of the kind of pan may be omitted, and if the amount of cooking varies little, detection of the amount of cooking may be omitted. Thus, as a cooking appliance, an arrangement meeting the purpose may be selected.

BRIEF EXPLANATION OF THE DRAWINGS

FIG. 4 is a flow chart showing an example of temperature control operation.

FIG. 7 is a flowchart showing another embodiment of the temperature compensation section IV of FIG. 4.

DESCRIPTION OF THE PREFERRED EMBODIMENTS

The present invention is elucidated in detail referring to the accompanying FIGS. 1 to 10.

Figure 1:
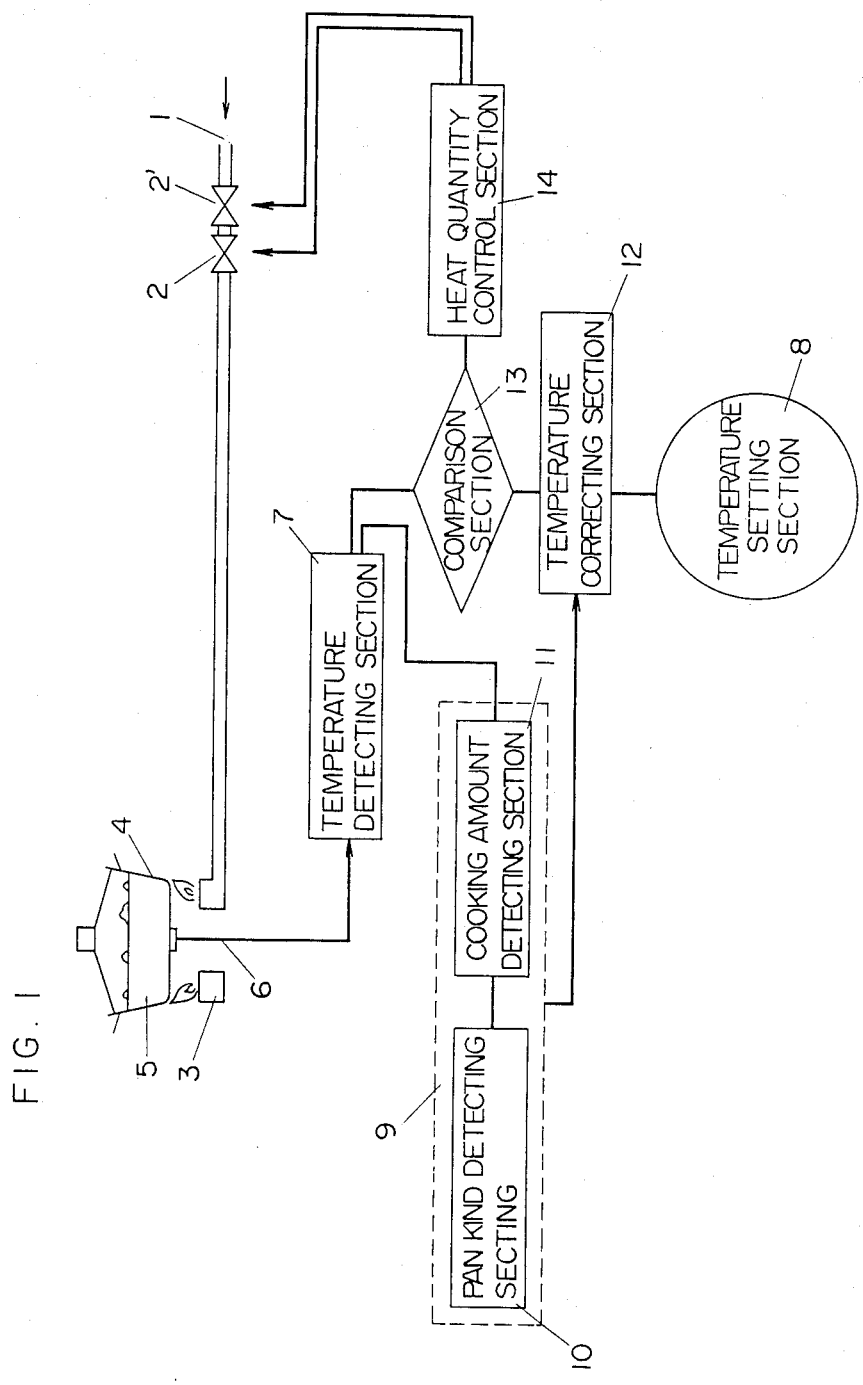
FIG. 1 is a schematic sectional view of a cooker in accordance with the present invention, together with block diagram of its heating control system.

FIG. 1 shows an example of a cooker using a gas heater and other related parts embodying the present invention.

Gas entering at an inlet 1 passes through a solenoid valve 2' and a proportional control valve 2 and burns in a burner 3. The burner 3 heats the bottom of a pan 4 to give heat to food 5. The numeral 6 denotes a temperature sensor in contact with the bottom of the pan 4; 7 denotes a temperature detecting section for detecting the temperature of a temperature sensor 6; 8 denotes a temperature presetting section, for example comprised of a variable resistor, etc. and 9 denotes a gradient detecting section attached to the temperature detecting section 7 for detecting the gradient of temperature rise of the pan bottom, said gradient detecting section 9 being composed of a pan kind detecting section 10 and a cooking amount detecting section 11. The numeral 12 denotes a temperature correcting section for correcting a preset temperature for a temperature presetting section 8 according to the kind of the pan and the amount of cooking by the pan kind detecting section 10 and cooking amount detecting section 11 of the gradient detecting section 9, and 13 denotes a comparison section for comparing the temperature of the temperature detecting section 7 with the temperature corrected by the temperature correcting section 12 and driving the solenoid valve 2' and proportional control valve 2 by means of a heat quantity control section 14 so as to control the combustion rate of the burner 3. Thus, the arrangement is such that even if the kind of the pan or the amount of cooking is changed, correction is made so that the temperature of the food 5 equals a preset temperature provided by the temperature presetting section 8. In addition, in this arrangement, if the pan 4 remains unchanged, the gradient detecting section 9 may be limited to the cooking amount detecting section 11, and if the amount of cooking varies little, it may be limited to the pan kind detecting section 10.

According to a conventional control method, as shown in FIG. 10(b), a signal from the sensor 6 is fed directly to the heat quantity control section 14, which then produces a signal for driving the proportional control valve 2. That is, if the signal from the sensor 6 is lower than a preset temperature value in the heat quantity control section 14, the proportional control valve 2 is fully opened to cause the burner 3 to burn at a maximum. As the temperature of the sensor 6 rises to a preset temperature, the proportional control valve 2 is gradually throttled and the combustion rate is decreased. When the temperature of the sensor 6 reaches the preset temperature, the proportional control valve 2 is throttled to a minimum of opening, so that the burner 3 assumes the minimum combustion rate providing safety combustion. In this case, if the correlation between the temperature of the sensor 6 and the food 5 is constant, there would be no problem. However, since the pan and the amount of cooking change with the food, it is difficult to determine the correlation between the temperature of the sensor 6 and the food 5. For example, when tempura is prepared, there may be two cases, one where the pan wall is thick and the amount of oil is large, and the other where the pan wall is thin and the amount of oil is small. If the heat quantity control section 14 provides the same preset temperature, the oil temperature will be low in the former case and high in the latter case, and this difference in temperature is so large that there has been a problem in practice.

Figure 2:
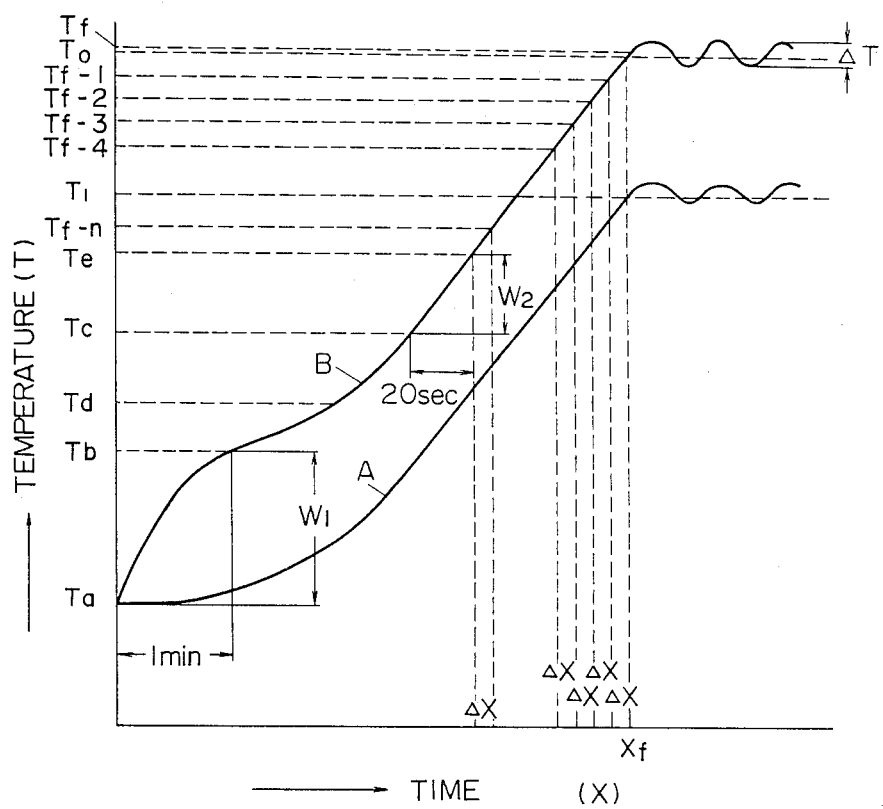
FIG. 2 is a time-temperature graph explaining principle and operation at initial stage of heating of the cooker in accordance with the present invention.

FIG. 2 is a temperature rise characteristic graph illustrating detection methods in the pan kind detecting section 10 and the cooking amount detecting section 11 of the gradient detecting section 9 and also showing a method of sampling temperature signals from the temperature detecting section 7 at the comparison section 13, the horizontal axis X representing time and the vertical axis T representing temperature. In the graph showing characteristics of preparation of tempura, A indicates the temperature of the contents, i.e., the oil temperature, and B indicates the temperature of the pan bottom, i.e., the temperature detected by the sensor 6. Temperature Ta rises along the curves A and B for the sensor temperature and oil temperature. The pan kind detecting section 10 identifies the kind of the pan 4 by the temperature rise gradient ($W_1 = T_b - T_a$) exhibited by the sensor temperature B in a given period of time (1 minute, in the embodiment) immediately after the start of heating. For a pan for which the difference between the sensor temperature B and the oil temperature A is greater (generally, where the pan wall thickness is large or the heat conduction of the pan material is poor), the gradient $W_1$ is greater. Further, the smaller the temperature difference, the smaller the gradient $W_1$. Thus, there is a formula of correlation between the temperature difference and the gradient $W_1$, and a temperature correction $P(=aW_1-b$, where a and b are constants which are experimentally determined) based on the kind of the pan is obtained. As the temperature is increased to exceed a temperature $T_d$, the rise of the sensor temperature B becomes stabilized in conformity with the amount of cooking. This temperature $T_d$ is about 100° C. in the case of tempura oil. (In the case of heating within 100° C. where water exists, the temperature $T_d$ is about 60° C.) The cooking amount detecting section 11 judges the amount of cooking by a gradient ($W_2 = T_e - T_c$) established in a given period of time (20 seconds, in the embodiment) after the time corresponding to a measurement start temperature $T_c$ (120° C. for high temperature as in the preparation of tempura, and 70° C. for heating within 100° C.) which is above the temperature $T_d$. The greater the difference between the sensor temperature B and the oil temperature A is, the greater the amount of cooking and vice versa. Thus, the amount of temperature correction is so determined that it is zero for a standard amount of cooking in the pan 4, that it is a positive value, where the gradient $W_2$ is smaller, for a greater amount of cooking than the standard, and that it is a negative value, where the gradient $W_2$ is greater, for a smaller amount of cooking than the standard. In this way, it is possible to make temperature correction $Q(=mW_2+n$, where m and n are constants which are experimentally determined) in accord with the amount of cooking, by means of the gradient $W_2$.

Thus, a formula of correlation also exits between the temperature difference due to a variation in the amount of cooking, and the gradient $W_2$, so that the correction temperature Q can be found.

By means of the gradients $W_1$ and $W_2$ associated with the pan kind detecting section 10 and the cooking amount detecting section 11, the respective correction temperatures P and Q can be found (however, one of the correction temperature P and Q may sometimes be omitted). And the value of the sensor temperature B is set at $T_o = T_1 + P + Q$ so that the temperature of the oil will be the preset temperature $T_1$ preset by the temperature presetting section 8. In order to make a comparison between the corrected temperature $T_o$ and the temperature signal from the temperature detecting section 7, the comparison section 13 successively measures temperatures $T_{f-n} \sim T_f$ at sampling time intervals as $\Delta X$, and compares them with the corrected temperature $T_o$. When the sensor temperature B is $T_o$, the temperature A of the oil in the pan 4 has reached the preset temperature $T_1$. If, at time $X_f$, the sensor temperature is $T_f$, exceeding $T_o$, then the heat quality control section 14 acts to maintain $T_o$ to a certain accuracy of $\Delta T$ by means of the proportional control valve 2 and solenoid valve 2'. In addition, the proportional control valve 2 may be arranged to act also as the solenoid valve 2'.

Figure 3A:
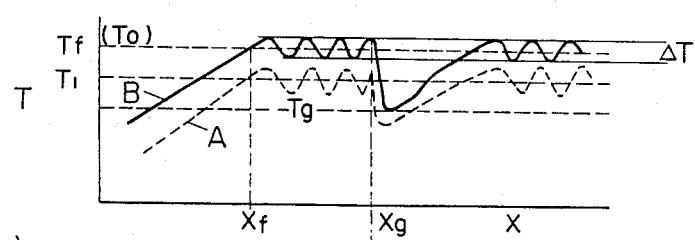
FIG. 3(a) is another time-temperature graph explaining principle and operation of proportional control of the cooker in accordance with the present invention.
Figure 3B:
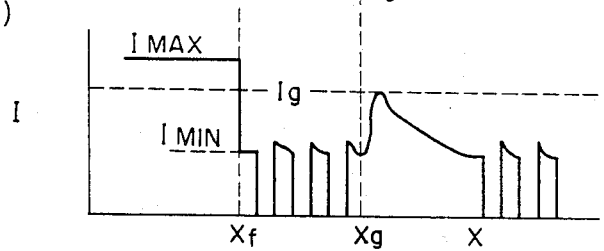
FIG. 3(b) is a time-current graph of the operation of the cooker of FIG. 3(a).

FIG. 3 shows a control characteristic after temperature $T_o$ has been reached, wherein the horizontal axis X represents time, and the vertical axis T of FIG. 3(a) represents temperature, and a broken line A indicates the temperature of the food 5 and a solid line B indicates the temperature of the sensor 6, as in FIG. 2. The vertical axis I of FIG. 3B(b) represents control current I through the proportional control valve 2, which is proportional to the combustion rate of the burner 3. Up to time $X_f$, the proportional control current I is at a maximum and the combustion rate of the burner 3 is also at a maximum until the signal from the comparison section 13 is $T_f \geq T_o$, as shown in FIG. 2. At time $X_f$, the sensor temperature $T_f \geq T_o$, and when the temperature of the food 5 is the preset temperature $T_1$, the proportional control current I is decreased or the solenoid valve 2' is closed to decrease the combustion rate or stop combustion, so as to maintain the sensor temperature $T_o$ to the accuracy of $\Delta T$. Then, in accordance with the difference between the sensor temperature B and the temperature $T_o$ to which the preset temperature $T_1$ has been corrected, the current I through the proportional control valve 2 is increased or decreased and the solenoid valve 2' is opened or closed, so as to control the combustion rate. If at time $X_g$, an addition to the food 5 is made, the food temperature A lowers. Consequently, the sensor temperature B also lowers, detecting the lowering of the food temperature A, and the heat quantity control section 14 increases the proportional control valve current I to $I_g$ in accordance with the difference between the temperature $T_g$ and the corrected temperature $T_o$. As a result, the combustion rate is increased and the temperature B returns to the original temperature $T_o$ and the food 5 maintains $T_1$. The size of $I_g$ varies with $T_o - T_g$ in such a manner that it is large when $T_o - T_g$ is large and it is small when $T_o - T_g$ is small.

In addition, if the appliance is used without the pan 4 placed thereon or if the corrected temperature $T_o$ should exceed the preset upper limit, the upper limit temperature is controlled. In this embodiment, if the corrected temperature $T_o$ exceeds 240° C., the upper limit temperature is set at 240° C. This is because, even in the case of tempra, which is a representative dish requiring high temperature, there is a danger of the oil igniting, leading to a fire, if the sensor temperature B exceeds 240° C.

In cases where complicated control systems, such as the one described above, in recent years microcomputers have often been used. FIG. 4 shows a simple flowchart to be used where a control system adapted to perform the functions described above with reference to FIGS. 1–3 is constructed using a microcomputer.

In FIG. 4, IG denotes a subroutine for an ignition sequence for the burner 3; S denotes a subroutine for reading in the temperature B of the sensor 6; and SS denotes a subroutine for the current I which increases or decreases the opening of the proportional control valve 2 or opens or closes the solenoid valve 2' according to the size of the temperature $T_o - T_g$. The character I denotes the pan kind detecting section which calculates the temperature correction P based on the kind of the pan from the temperature rise gradient $W_1$ determined by the sensor temperature $T_a$ after ignition and the temperature $T_b$ obtained 1 minute later. The character II denotes the cooking amount detecting section arranged so that as the temperature further rises and if $T_c$ of the sensor temperature B is lower than $T_d$, it passes the loop of III and waits until $T_c \geq T_d$. When $T_c \geq T_d$, it calculates the temperature correction Q based on the amount of cooking from the temperature rise gradient $W_2$ determined by the measurement start temperature $T_c$ and the temperature $T_e$ obtained 20 seconds later. The character IV denotes the temperature correcting section which determines $T_o$ both by the preset temperature $T_1$ preset by the temperature presetting section 8 and by the aforesaid correction temperatures P and Q. In this connection, as previously described, if the pan is constant, the pan kind detecting section I is unnecessary, and if the amount of cooking varies little, the cooking amount detecting section II is unnecessary. In such cases, either the pan kind detecting section I or the cooking amount detecting section II may be omitted from the flowchart of FIG. 4. Thus, then, one of the correction temperatures P and Q will be absent. The character V denotes a comparison section which compares $T_o$ with sensor temperatures $T_{f-n} \sim T_f$ read into the computer at sampling time intervals of $\Delta T$, and waits until $T_f \geq T_o$. The character IV denotes the heat quantity control section which delivers an output conforming to the temperature $T_o - T_g$ and transfers it to the proportional control valve 2 and solenoid valve 2' by SS. $X_{END}$ shows a program for stopping the operation when a preset cooking time X has elapsed. In addition, a, b, m and n used when the pan kind detecting section I and the cooking amount detecting section II calculate the correction temperatures P and Q, are constants.

Figure 5:
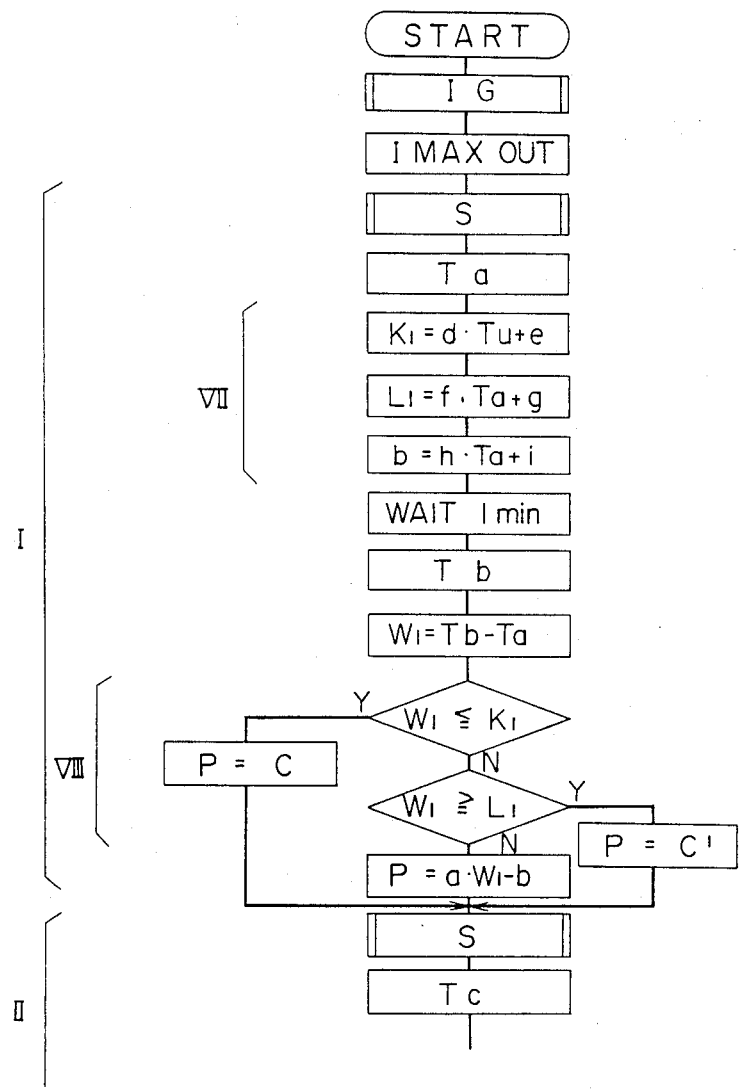
FIG. 5 is a flowchart showing another embodiment of the pan kind detecting section I of FIG. 4.

FIG. 5 shows another embodiment of the pan kind detecting section I of FIG. 4, including a correcting section VII based on the heating start temperature $T_a$, and a temperature control section VIII. The greater the temperature rise gradient $W_1$ based on the kind of the pan, the greater the difference between the sensor temperature B and the food temperature A, and vice versa.

As an exception to the above, at the temperature control section VIII, a pan 4 whose heat capacity is extremely high, such as a cast iron pan, takes a long time to be heated to a given temperature, so that the gradient $W_1$ for the pan is smaller than for ordinary pans. Therefore, if the gradient $W_1$ is smaller than a predetermined value $K_1$, the correction temperature P can be set at C determined as a special pan. For a pan whose heat capacity is low and whose wall is thick (for example, a 5-mm thick pan of aluminum casting), the gradient $W_1$ is greater than for ordinary pans. Therefore, if the gradient $W_1$ is greater than a predetermined value $L_1$, the correction temperature P can be set at C' determined as another special pan. For the correction temperature C and C', the difference between the sensor temperature B and the food temperature A is used in the temperature control section VIII as special pans on opposite sides.

Besides these, it is possible to add special pans. Further, instead of using fixed values such as the correction temperatures C and C', it is possible to change the constant a or b used in calculation.

The correcting section VII calculates the constant b for finding the comparison values $K_1$ and $L_1$ and the correction temperature P as a function of the heating start temperature $T_o$. It detects the gradient $W_1$ and if $W_1$ is below or above $K_1$ or $L_1$, temperature correction P for the predetermined temperatures C and C' is made as a special pan 4 by the temperature control section VIII. Thus, the arrangement is such that if $W_1$ is within the limits of comparison values $K_1$ and $L_1$, the pan 4 is judged as a common pan and the correction temperature P is calculated as a function of the gradient $W_1$ from the constant a and the calculated constant b.

In addition, d, e, f, g, h and i for calculating the comparison values $K_1$ and $L_1$ and the constant b for the correcting section VII are constants which are experimentally determined.

Figure 6:
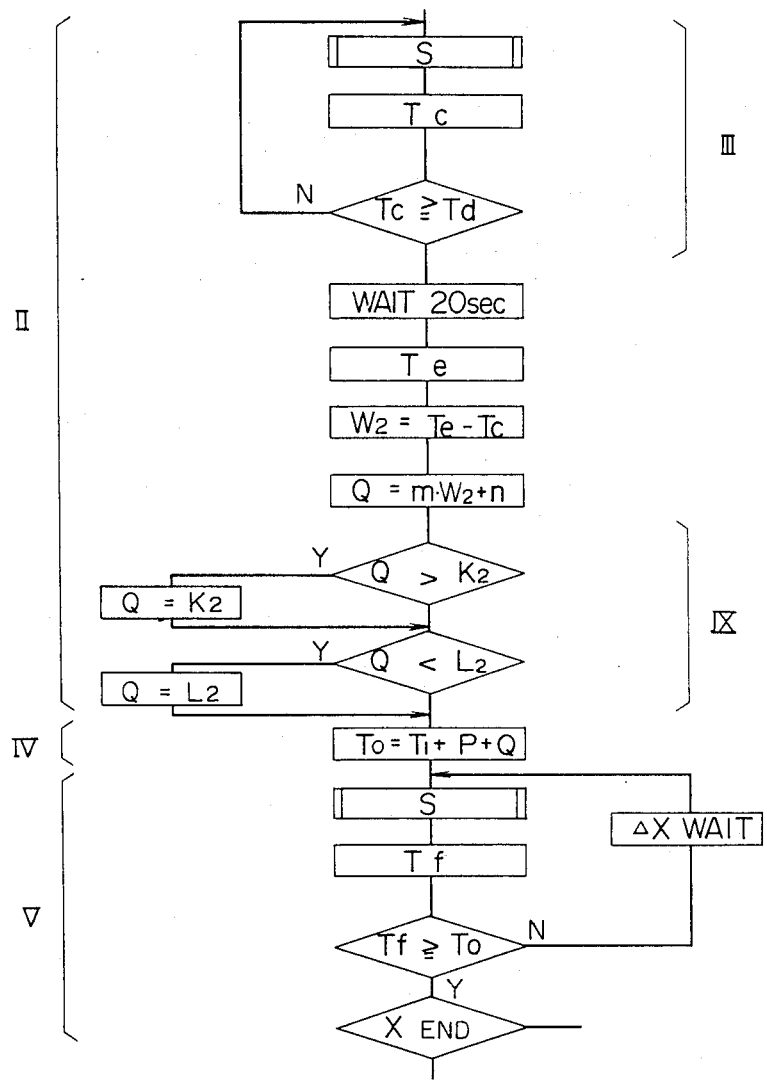
FIG. 6 is a flowchart showing another embodiment of the cooking amount detecting section II of FIG. 4.

FIG. 6 shows another embodiment of the cooking amount detecting section II of FIG. 4, having a control section IX for correction temperature Q.

The control section IX determines the upper and lower limits of correction temperature Q in consideration of the fact the amount of cooking, or food to be put in the pan 4, has upper and lower limits, wherein if correction temperature Q is above or below the upper or lower limit (predetermined temperature) $K_2$ or $L_2$, it is controlled by $K_2$ and $L_2$.

The section IV' in FIG. 7 is another embodiment of the temperature control section of FIG. IV, wherein if the corrected temperature $T_o$ exceeds a predetermined upper limit temperature (240° C., in the embodiment), to controlled at its upper limit by the section X is taken as the upper limit temperature.

Figure 8:
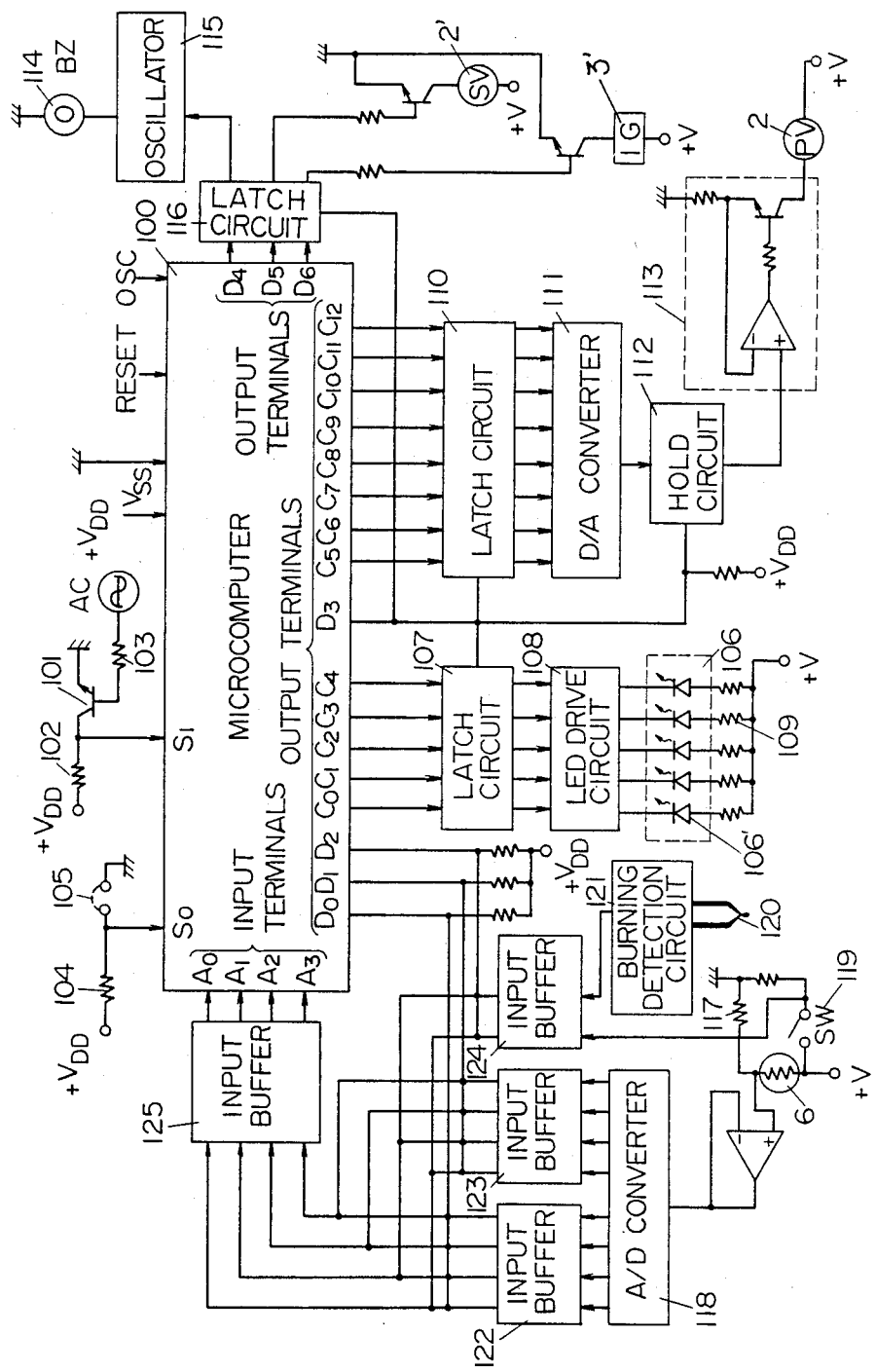
FIG. 8 is a detailed circuit block diagram of a case where the temperature control part is constituted with a microcomputer.

FIG. 8 shows a circuit diagram of an actual construction of the apparatus, wherein calculations for the temperature control is made by a microcomputer 100. A stored program general purpose LSI microcomputer is used as the microcomputer 100. The microcomputer has input terminals $S_0$, $S_1$, $A_0$, $A_1$, $A_2$ and $A_3$, output terminals $C_0$, $C_1$, $C_2$, $C_3$, $C_4$, $C_5$, $C_6$, $C_7$, $C_8$, $C_9$, $C_{10}$, $C_{11}$, $C_{12}$, $D_0$, $D_1$, $D_2$, $D_3$, $D_4$, $D_5$ and $D_6$, power source connection terminals $V_{DD}$ and $V_{SS}$, clock signal terminal Osc and initializing terminal RESET. Commercial AC power frequency signal is input from the input terminal $S_1$ after waveforming by circuit of a transistor 101 and resistors 102 and 103. The microcomputer 100 counts the commercial power frequency signal as reference time pulse for its timer. Terminal $S_0$ is for adjusting for difference of the commercial power frequency by districts, and select necessary operation sequence by change of logic level at the terminal $S_0$ through connection and disconnection of the jumping wire 105.

The output terminals $C_0$, $C_1$, $C_2$, $C_3$ and $C_4$ are for driving displaying diode unit 106 for cook temperature or cook time length, and displays necessary contents by LEDs 106' by using the latch circuit 107 and LED drive circuit 108. A resistor 109 is a current limiter for the LEDs 106'. The output terminals $C_5$, $C_6$, $C_7$, $C_8$, $C_9$, $C_{10}$, $C_{11}$ and $C_{12}$ are for outputting driving signals for proportional control valve 2, and burning control in $2^8=256$ stages are obtainable by the output therefrom. The signals are led through a latch circuit 110, D/A converter 111 and holding circuit 112, and are given to the amplifier 113 which feeds current to the proportional control valve 2.

The output terminal $D_4$ is outputting signal to drive a buzzer 114 for reporting, for instance, a completion of a cooking, and an oscillator 115 is driven by this output to and drives the buzzer 114. Instead of the oscillator 115, clock signal of the microcomputer 100 may be used.

The output terminal $D_5$ is for driving an electromagnet valve 2' for stop of burning, and the output terminal $D_6$ is for actuating a burner ignitor 3' (not shown in FIG. 1). The outputs data of the output terminals are latched by a latch circuit 116. Latch circuits 107, 110, 116 and the hold circuit 112 are reset of their data by resetting signal from the output terminal $D_3$.

The input terminals $A_0$, $A_1$, $A_2$ and $A_3$ are for taking 4 bit data into the microcomputer 100. Temperature measuring signal, from the temperature sensor 6, burning detection signal and valve state detection signals are input to these input terminals $A_0$ to $A_3$. In the table type gas burner the temperature range to be detected is selected between 50°–250° C., which has a temperature range of 200° C. In order to measure the temperature within 1.0° C. resolution for the 200° C. temperature range, 200 steps are necessary, and therefore, 8 bit data must be input in the microcomputer 100. Therefore, the voltage of the temperature sensor 6 is input to the A/D converter 118 so as to be converted into 8 bit digital signal, and the data are divided into an upper 4 bit and lower 4 bit which are input to input buffer circuits 122 and 123, respectively. Furthermore, signal of a cook switch 119 and output signal of a burning detection circuit 121 which outputs output of a burning detection thermocouple 120, are similarly input through an input buffer circuits 124 and 125 to the input terminals $A_0$, $A_1$, $A_2$ and $A_3$. Selection of these input signals is effected by output terminals $D_0$, $D_1$ and $D_2$.

Furthermore, a preset temperature of the temperature sensor 6 may be input when necessary. If the microcomputer 100 has more input port than those of $A_0$ to $A_3$, then there is no way of splitting the data into two sets of 4 bit data.

Figure 9:
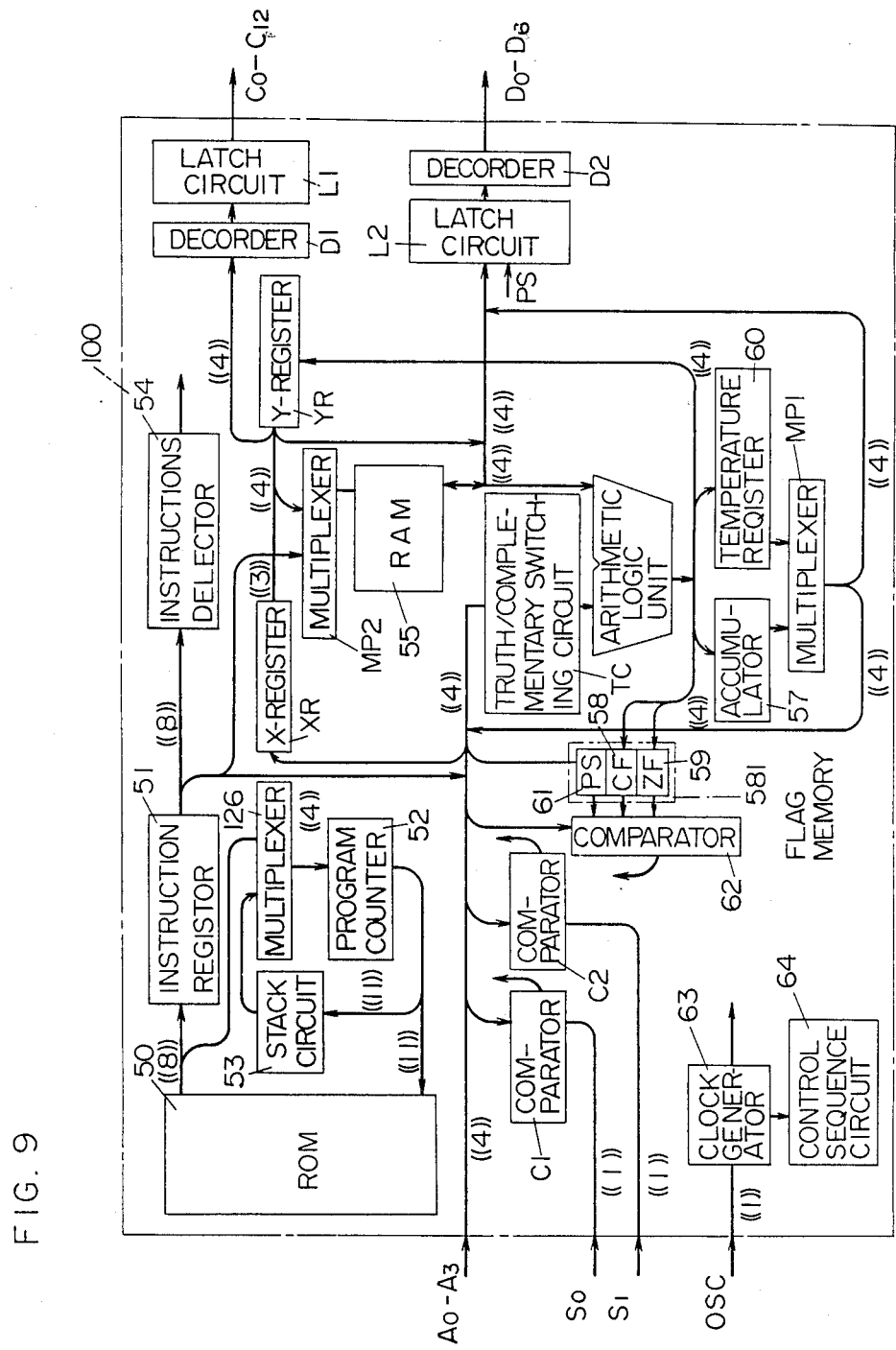
FIG. 9 is a chart showing architecture of the microcomputer 100 of the example of FIG. 8.
Figure 10:
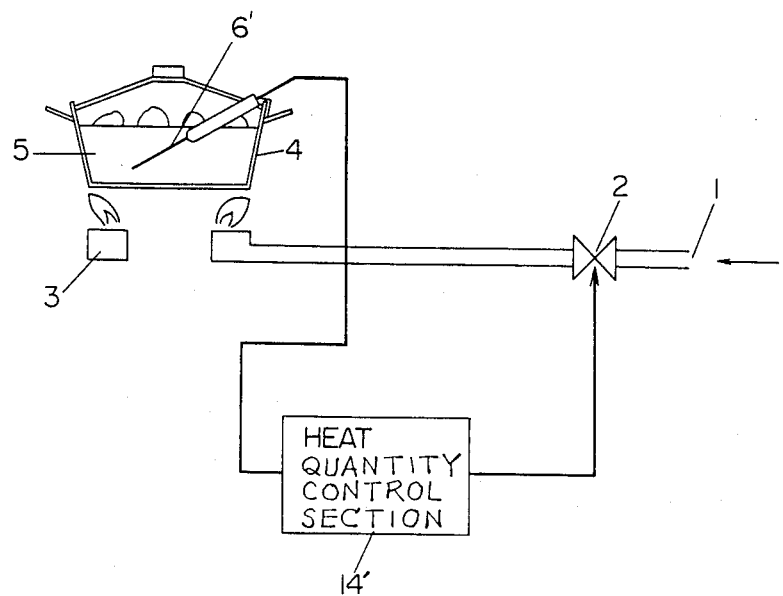
FIG. 10(a) and FIG. 10(b) are the schematic views of the examplary conventional automatic temperature control gas-cooker.
Figure 10:
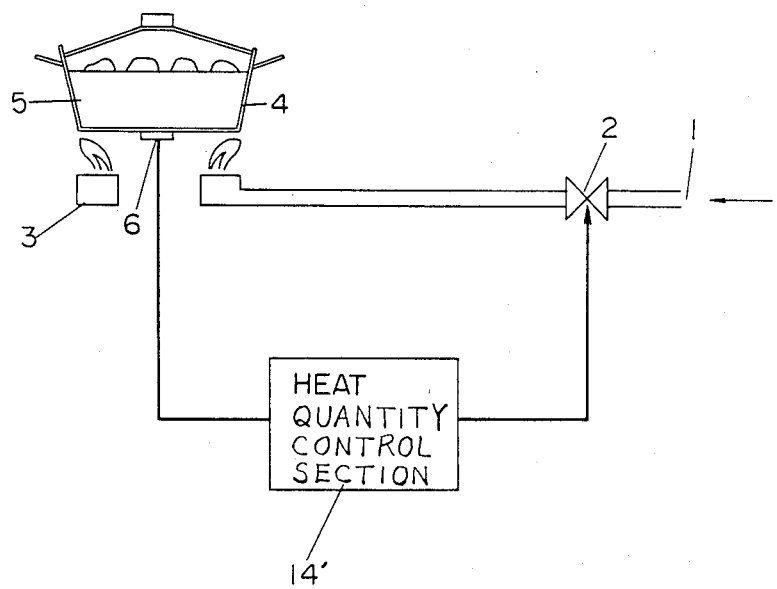

FIG. 9 shows an example of architecture diagram of the microcomputer 100, and is elucidated hereafter:

A ROM 50 designates a fixed memory wherein settings, displayings and operations controls are programmed and stored therein in the type of instruction code. The microcomputer 100 can store 8 bit instruction code of a largest 2048 steps. An instruction register 51 temporarily stores instruction code issued from the ROM 50. A program counter 52 is for designating and refereshing address of the instruction code in ROM 50, and 11 bit are necessary therefor in order to designate addresses of 2048 ($=2^{11}$) steps at most. A stack 53 is a register to retain return address when subroutine is controlled. Multiplexer 126 is for selection of address stored in the stack 53 and designated address at execution of branch instruction. Instruction decoder 54 is for decoding the instruction of the instruction decoder 51.

RAM 55 is a data memory capable of write-in and read-out at 4 bit unit, and has a memory capacity of 4 bit×128 steps. The addressing of the 128 steps can be made by 7 bits. For address register to the RAM 55, 3 bit X-register XR and 4 bit Y register YR are provided. The contents of the Y register YR is decoded by a decoder 127 for individual designation of the output terminals $C_0$ to $C_{12}$.

Arithmetic logic unit 56 is for execution of operations and determinations. Arithmetic logic unit 56 receives by means of instructions thereto a pair of 4 bit data, and the result of the execution is, depending on necessity, stored in an accumulator 57, carry flag memory 58, zero flag memory 59, Y register YR or RAM 55. A flag memory 581 includes the carry flag memory 58, which is set by a carry from the highest bit issued at an operation in ALU 56, the zero flag memory 59, which is set when the result of operation in ALU 56 is zero, and a program status memory 61, which is a 1 bit memory and is set or reset by instruction. A temporary register 60 is a 4 bit register for temporary storing. The outputs of the program status memory 61, the carry flag memory 58 and the zero flag memory 59 are led through a comparator 62 to a control sequential circuit 64, which control internal operation sequence of the microcomputer 100. Clock generator 63 issues clock signal of the microcomputer.

In FIG. 9 numerals which are in double brackets and are put on signal lines designate bit number of the signal lines.

The microcomputer 100 of the architecture shown in FIG. 9 operates being controlled by instruction codes stored in ROM 50 of itself, and controls various devices and stores and read out heating pattern of automatic cooking.

The architecture of the microcomputer described above is such that it is controlled by instruction codes stored in the ROM 50, and thereby controls various devices connected to input terminals and it also stores and reads out heating patterns for automatic cooking.

The temperature control function of the present invention is stored in the ROM 50 of the microcomputer, and the gradient $W_1$, $W_2$ in the gradient detecting section 9 and the temperature in the temperature detecting section 7 are stored or rewritten in RAM 55.

As has been described so far, the cooking temperature control system of the present invention identifies the kind of the pan by the gradient of temperature rise detected a given time immediately after the start of heating by the gradient detecting section in the case of preparing tempura or warming milk and judges the amount of cooking from the gradient established after a given stabilized temperature rise conforming to the amount of cooking has been reached. As a function of these gradients, the correction temperature is calculated and the sensor temperature is determined to cause the temperature of the food to reach the preset temperature, so that the optimum temperature for tempera or milk is obtained, such optimum temperature being then maintained by control. Thus, even if the kind of the pan or the amount of cooking is changed, the required temperature for food can be obtained with high accuracy. In addition, if the pan is constant, identification of the kind of the pan may be omitted, and if the amount of cooking varies little, judgment of the amount of cooking may be omitted, thereby simplifying the system.

The gradient detecting section and the comparison section are arranged to measure the sensor temperature gradients and sensor temperatures sampled at predetermined time intervals, whereby a system can be constructed very easily which facilitates control by a microcomputer and, through program processing alone, enables controlled temperatures to be detected with high accuracy.

The pan kind detecting section is capable of correction by means of heating start temperature, without imposing limitations on the working conditions or aggravating the accuracy of cooking temperature.

The cooking amount detecting section is arranged to make measurement when the temperature of the temperature sensor exceeds a predetermined value (about 120° C. for high temperature as in tempura, and about 70° C. for low temperature heating within 100° C.). Since temperature unstability caused by formation of dew drops on the pan bottom due to heating or by the influence of flow of food is overlooked and since the stabilized gradient of temperature rise is used, reliable correction can be made to obtain accurate cooking temperature.

If the gradient or temperature exceeds the predetermined upper or lower limit, the correction temperature is controlled, by the pan kind detecting section or the cooking amount detecting section, and if the temperature corrected by the gradient detecting section exceeds the predetermined upper limit temperature (240° C.), the control temperature is controlled by the upper limit temperature, so that the system is high in safety and can be used under special working conditions.

Thus, a convenient cooking appliance can be provided in which optimum cooking temperature can be obtained irrespective of the kind (material and thickness) of the pan and the amount of cooking.

The present embodiment has been described with reference to a proportional control system for gas heaters, but electric heater and other cooking appliances may be used and it is applicable to ovens besides heaters. Further, instead of proportional control, high-low control or on-off control may be used.

When the invention is applied to an electric heater, the heating control means can be easily realized by a relay or the like to effect on-off control of the heater or by a thyrister to effect proportional control of the heating rate. Unlike a gas burner, since there is no danger of the fire being put out, there is no limitation on the minimum combustion rate and the combustion rate can range from zero to the maximum.

As described in the above embodiment, the temperature sensor can be applied more effectively to a cooking appliance arranged to detect the temperature of the bottom of a pan holding food being cooked, eliminating error due to the material and thickness of the pan and the amount of cooking, and enabling optimum temperature control and cooking.

What is claimed is:

1. A cooking temperature control system comprising: a means for heating food to be cooked, a temperature detecting section for detecting the temperature of a temperature sensor in contact with the bottom of a pan, a temperature presetting section that can be preset as desired, a temperature correcting section for correcting a preset temperature by a pan kind detecting section attached to said temperature detecting section for detecting the temperature rise gradient of the pan bottom, and a heat quantity control section for delivering a control signal to a heating control means for controlling the heating rate of said heating means, wherein the temperature signal from said temperature detecting section and the temperature corrected by said temperature correcting section are compared with each other in a comparing section which is operatively connected to said heat quantity control section, and wherein the heat quantity control section increases or decreases the amount of heat generated by said heating means and controlled by said heating control means or stops it so as to maintain the temperature of the food at a constant value.

2. A cooking temperature control system as set forth in claim 1, wherein the pan kind detecting section of the gradient detecting section is arranged to calculate the correction temperature as a function of the gradient of temperature rise of the pan bottom established at a given time immediately after ignition.

3. A cooking temperature control system as set forth in claim 2, wherein the pan kind detecting section of the gradient detecting section has a correcting section based on the heating start temperature.

4. A cooking temperature control system, as set forth in claim 2, wherein the pan kind detecting section of the gradient detecting section corrects a predetermined temperature if the gradient of temperature rise of the pan bottom at a given time is above or below comparison values calculated as a function of the heating start temperature.

5. A cooking temperature control system, as set forth in claim 3, wherein the pan kind detecting section of the gradient detecting section corrects a predetermined temperature if the gradient of temperature rise of the pan bottom at a given time is above or below comparison values calculated as a function of the heating start temperature.

6. A cooking temperature control system as set forth in claim 1, wherein the comparing section compares temperature signals from the temperature sensor detected at given time intervals by the temperature detecting section with the correction temperature in the temperature correcting section.

7. A cooking temperature control system as set forth in claim 1, wherein if the sum of the temperature corrected by the pan kind detecting section or cooking amount detecting section of the gradient detecting section, and the preset temperature in the temperature setting section is above a predetermined upper limit temperature, it is controlled by said upper limit temperature.

8. A cooking temperature control system comprising: a means for heating food being cooked, a temperature detecting section for detecting the temperature of said food through a temperature sensor in contact with the bottom of a pan, a temperature presetting section that can be preset as desired, a temperature correcting section for correcting a preset temperature by a cooking amount detecting section attached to said temperature detecting section for detecting the temperature rise gradient of the food by the temperature of the bottom of a pan, and a heat quantity control section for delivering a control signal to a heating control means for controlling the heating rate of said heating means, wherein the temperature signal from said temperature detecting section and the temperature corrected by said temperature correcting section are compared with each other in a comparing section which is operatively connected to said heat quantity control section, and wherein the heat quantity control section increases or decreases the amount of heat generated by said heating means and controlled by said heating control means or stops it so as to maintain the temperature of the food at a constant value.

9. A cooking temperature control system as set forth in claim 8, wherein the cooking amount detecting section of the gradient detecting section is arranged to calculate the correction temperature as a function of the gradient esablished at a given time after the temperature rise of the pan bottom has been stabilized in conformity with the amount of cooking.

10. A cooking temperature control system as set forth in claim 9, wherein the cooking amount detecting section of the gradient detecting section is arranged to be heated by the means which heats the food, and measurement is made after the temperature sensor has detected the measurement start temperature.

11. A cooking temperature control system as set forth in claim 9, including a control section which, if the temperature to be corrected in the cooking amount detecting section of the gradient detecting section is above or below predetermined values, controls the correction temperature to said predetermined value.

12. A cooking temperature control system as set forth in claim 8, wherein the comprising section compares temperature signals from the temperature sensor detected at given time intervals by the temperature detecting section with the correction temperature in the temperature correcting section.

13. A cooking temperature control system as set forth in claim 8, wherein if the sum of the temperature corrected by the pan kind detecting section or cooking amount detecting section of the gradient detecting section, and the preset temperature in the temperature setting section is above a predetermined upper limit temperature, it is controlled by said upper limit temperature.

14. A cooking temperature control system comprising: a means for heating food being cooked, a temperature detecting station for detecting the temperature of a temperature sensor in contact with the bottom of a pan, a temperature presetting section that can be preset as desired, a temperature correcting section having a gradient detecting section attached to said temperature detecting section for detecting the temperature rise gradient of the pan bottom, said temperature correcting section being adapted to cooperate with a pan kind detecting section and a cooking amount detecting section included in the gradient detecting section so as to correct the preset temperature, and a heating control means for controlling the heating rate of said heating means, wherein the temperature signal from said temperature detecting section and the temperature correcting section are compared with each other by a comparing section which is operatively connected to said heat quantity control section, and wherein the heat quantity control section increases or decreases the amount of heat generated by said heating means or stops it so as to maintain the temperature of the food at a constant value.

15. A cooking temperature control system as set forth in claim 14, wherein if the sum of the temperature corrected by the pan kind detecting section or cooking amount detecting section of the gradient detecting section, and the preset temperature in the temperature setting section is above a predetermined upper limit temperature, it is controlled by said upper limit temperature.

16. A cooking temperature control system as set forth in claim 14, wherein the pan kind detecting section of the gradient detecting section is arranged to calculate the correction temperature as a function of the gradient of temperature rise of the pan bottom established at a given time immediately after ignition.

17. A cooking temperature control system as set forth in claim 16, wherein the pan kind detecting section of the gradient detecting section has a correcting section based on the heating start temperature.

18. A cooking temperature control system, as set forth in claim 17, wherein the pan kind detecting section of the gradient detecting section corrects a predetermined temperature if the gradient of temperature rise of the pan bottom at a given time is above or below comparison values calculated as a function of the heating start temperature.

19. A cooking temperature control system, as set forth in claim 16, wherein the pan kind detecting section of the gradient detecting section corrects a predetermined temperature if the gradient of temperature rise of the pan bottom at a given time is above or below comparison values calculated as a function of the heating start temperature.

20. A cooking temperature control system as set forth in claim 14, wherein the cooking amount detecting section of the gradient detecting section is arranged to calculate the correction temperature as a function of the gradient established at a given time after the temperature rise of the pan bottom has been stabilized in conformity with the amount of cooking.

21. A cooking temperature system as set forth in claim 20, wherein the cooking amount detecting section of the gradient detecting section is arranged to be heated by the means which heats the food, and measurement is made after the temperature sensor has detected the measurement start temperature.

22. A cooking temperature control system as set forth in claim 20, including a control section which, if the temperature to be corrected in the cooking amount detecting section of the gradient detecting section is above or below predetermined values, controls the correction temperature to said predetermined value.

23. A cooking temperature control system as set forth in claim 14, wherein the comparing section compares temperature signals from the temperature sensor detected at given time intervals by the temperature detecting section with the correction temperature in the temperature correcting section.

* * * * *